United States Patent [19]
Zamora et al.

[11] Patent Number: 4,887,212
[45] Date of Patent: Dec. 12, 1989

[54] PARSER FOR NATURAL LANGUAGE TEXT

[75] Inventors: Antonio Zamora, Chevy Chase; Michael D. Gunther, Gaithersburg; Elena M. Zamora, Chevy Chase, all of Md.

[73] Assignee: International Business Machines Corporation, Armonk, N.Y.

[21] Appl. No.: 924,670

[22] Filed: Oct. 29, 1986

[51] Int. Cl.$^4$ .......................... G06F 5/00; G06F 15/00
[52] U.S. Cl. ...................................... 364/419; 364/900
[58] Field of Search ................ 364/419, 200 MS File, 364/900 MS File

[56] References Cited

U.S. PATENT DOCUMENTS

| | | | |
|---|---|---|---|
| 4,635,199 | 1/1987 | Muraki | 364/419 |
| 4,661,924 | 4/1987 | Okamoto et al. | 384/900 |
| 4,674,066 | 8/1987 | Kucera | 364/900 |

OTHER PUBLICATIONS

L. L. Cherry, "Parts—A System for Assigning Word Classes to be English Text," Bell Laboratories Computing Science Technical Report, No. 81, Bell Laboratories, Murray Hill, NJ (1978).
C. Rieger et al., "Word Expert Parsing," Proceedings, Sixth International Joint Conference on Artificial Intelligence, Tokyo, 1979.
M. P. Marcus, "A Theory of Syntactic Recognition for Natural Language," The MIT Press, Cambridge, MA, 1980.
N. Sager, "Natural Language Information Processing," A Computer Grammar of English and its Applications, Addison-Wesley Publishing, Reading, MA, 1981.
G. E. Heidorn, et al., "The EPISTLE Text-Critiquing System," IBM Systems Journal, vol. 21, No. 3, pp. 305-326 (1982).
J. J. Robinson, "Diagram: A Grammer for Dialogues," Comm. of the AC, vol. 25, No. 1, pp. 27-47 (1982).
W. A. Woods, "Transition Network Grammars for Natural Language Analysis," Comm. of the ACM, vol. 13, No. 10, pp. 591-606 (1970).

Primary Examiner—Allen MacDonald
Attorney, Agent, or Firm—John E. Hoel

[57] ABSTRACT

An improved natural language text parser is disclosed which provides syntactic analysis of text using a fast and compact technique. Sequential steps of word isolation, morphological analysis and dictionary look-up combined with a complement grammar analysis, are applied to an input data stream of woods. Word expert rules, verb group analysis and clause analysis are then applied to an input data stream of words. Word expert words in the input data stream are associated with appropriate phrase markings. The principle of operation of the parser is applicable to a variety of Indo-European languages and provides a faster and more compact technique for parsing in a data processor than has been available in the prior art.

7 Claims, 9 Drawing Sheets

INTERPRETIVE PARSER

PROCEDURAL PARSER

LIST NODES:

| offset | | |
|---|---|---|
| 0 | SYSTEM FLAGS | USER FLAGS |
| +4 | POINTER TO PREVIOUS NODE | |
| +8 | POINTER TO NEXT NODE | |
| +12 | POINTER TO ITEM | |

STRING NODES:

| | | |
|---|---|---|
| 0 | SYSTEM FLAGS | USER FLAGS |
| +4 | POINTER TO STRING | |
| +8 | STRING LENGTH | |
| +12 | POINTER TO PROPERTY NODE | |

PROPERTY NODES:

| | | |
|---|---|---|
| 0 | SYSTEM FLAGS | USER FLAGS |
| +4 | PROPERTY NAME CODE | |
| +8 | PROPERTY VALUE | |
| +12 | POINTER TO PROPERTY NODE | |

COMPLEMENT GRAMMAR

MODEL AUXILIARY SEQUENCES

VI = INFINITIVE
VR = PAST PARTICIPLE
VG = PRESENT PARTICIPLE

VI, VR, AND VG EXCLUDE THE AUXILIARIES "MAY", "SHALL", "BE", "MUST" AND "OUGHT"; BUT INCLUDE "HAVE", "CAN" AND "DO".

INFINITIVE AND "OUGHT" VERB SEQUENCES

VI = INFINITIVE
VR = PAST PARTICIPLE
VG = PRESENT PARTICIPLE

VI, VR AND VG EXCLUDE THE
AUXILLIARIES "MAY", "SHALL",
"BE", "MUST" AND "OUGHT";
BUT INCLUDE "HAVE", "CAN" AND "DO".

"DO" VERB SEQUENCE

VI = INFINITIVE

VI EXCLUDES THE
AUXILIARIES "MAY", "SHALL",
"BE", "MUST", AND "OUGHT";
BUT INCLUDE "HAVE", "CAN" AND "DO".

"BE" VERB FORMS (1)

VR = PAST PARTICIPLE
VG = PRESENT PARTICIPLE

VR AND VG EXCLUDE THE AUXILIARIES "MAY", "SHALL", "BE", "MUST", AND "OUGHT"; BUT INCLUDE "HAVE", "CAN" AND "DO".

"HAVE" VERB FORMS

VR = PAST PARTICIPLE
VG = PRESENT PARTICIPLE

VR AND VG EXCLUDE THE AUXILIARIES "MAY", "SHALL", "BE", "MUST", AND "OUGHT"; BUT INCLUDE "HAVE", "CAN" AND "DO".

"BE" VERB FORMS (2)

VR = PAST PARTICIPLE
VG = PRESENT PARTICIPLE

VR AND VG EXCLUDE THE AUXILIARIES "MAY", "SHALL", "BE", "MUST", AND "OUGHT"; BUT INCLUDE "HAVE", "CAN" AND "DO".

ASSOCIATION OF A PARADIGM NUMBERS WITH WORD FORMS

LEVELS OF SYNONYM SUPPORT

CLAUSE ANALYSIS STEP 34

PARSER FOR NATURAL LANGUAGE TEXT

BACKGROUND OF THE INVENTION

1. Technical Field

The invention disclosed broadly relates to data processing and more particularly relates to linguistic applications in data processing.

2. Background Art

Text processing and word processing systems have been developed for both stand-alone applications and distributed processing applications. The terms text processing and word processing will be used interchangeably herein to refer to data processing systems primarily used for the creation, editing, communication, and/or printing of alphanumeric character strings composing written text. A particular distributed processing system for word processing is disclosed in the copending U.S. patent application Ser. No. 781,862 filed Sept. 30, 1985 now Pat. No. 4,731,735 entitled "multilingual Processing for Screen Image Build and Command Decode in a Word Processor, with Full Command, Message and Help Support," by K. W. Borgendale, et al. The figures and specification of the Borgendale, et al. patent application are incorporated herein by reference, as an example of a host system within which the subject invention herein can be applied.

Parsing is the analysis of text for the identification of sentence components including part of speech and phrase structure. Parsing may also involve the association of the sentence components into a representation of the meaning of the sentence.

Many of the problems encountered in parsing natural languages are due to semantic ambiguities. The ambiguities may result in difficulties in defining the sentence components, in assigning the part of speech, or in the association of the sentence components.

The difficulty in assigning part of speech is illustrated by the sentence "I saw her duck" where there is a question as to whether the pronoun "her" is a possessive pronoun and "duck" is a noun or whether "her" is an objective pronoun and "duck" is a verb.

The sentences "John has a book" and "John has a head" have identical structure and can be assigned parts of speech easily, but they require different meaning representations because the concept "book" is something that John possesses whereas "head" is a part of John.

In the sentence "Sam saw John with the telescope" it is not possible to ascertain whether Sam or John had the telescope and to bind the prepositional phrase with the appropriate noun.

Representing semantic distinctions in a computer framework is necessary for some types of applications, but there are many useful applications which are not affected by ambiguities in sentence structure or by the way in which meanings are represented.

PREVIOUS PARSING TECHNIQUES

Many parsing techniques have been reported in the literature. The techniques are fairly well automated for context-free languages (precise languages with no ambiguities) which comprise many of the languages used to program computers. For natural language parsing there is no standard methodology but some techniques that have been in vogue at one time or another are: transformational grammars, augmented transition network grammars, phrase structure grammars, word experts and string analysis.

There are two basic types of analysis: top-down and bottom-up. Top-down analysis attempts to recognize sentences by trying to find patterns such as subject-verb-complement in the sentences. Thus, a top-down parser may start with the premise that the sentence to be analyzed is a declarative sentence until examination of the components proves the assumption to be false. At that time a different structure type is hypothesized and the analysis continues until the sentence is completely analyzed or no sentence pattern applies.

In the bottom-up strategy the components of the sentence are built up, initially from the terminal symbols, and subsequently from the higher order components progressively until the analysis of the sentence is complete. An advantage of bottom-up parsing is that the sentence components are identified even when it is not possible to parse the complete sentence.

Both of these techniques for the identification of sentence components can be implemented by scanning the text left-to-right, right-to-left, by scanning the text multiple times, or by parallel processes coordinated by a synchronization mechanism.

It is apparent from the above that prior art and data processing techniques for parsing are neither fast enough nor compact enough for application in modern word processing applications. Further, prior art parsing techniques are generally limited to a single language and lack the generality for application in multi-lingual parsing environments.

OBJECTS OF THE INVENTION

It is therefore an object of the invention to provide an improved natural language parser that is faster than the prior art approaches.

It is still a further object of the invention to provide an improved natural language parser which is more compact than has been available in the prior art.

It is still a further object of the invention to provide an improved natural language parser which is capable of application for multiple languages.

SUMMARY OF THE INVENTION

These and other objects, features and advantages of the invention are accomplished by the parser for natural language text disclosed herein.

An improved natural language text parser is disclosed which provides syntactic analysis of text using a fast and compact technique. Sequential steps of word isolation, morphological analysis and dictionary look-up combined with a complement grammar analysis, are applied to an input data stream of words. Word expert rules, verb group analysis and clause analysis are then applied to provide an output data structure where the words in the input data stream are associated with their respective parts of speech and are grouped with appropriate phrase markings. The principle of operation of the parser is applicable to a variety of Indo-European languages and provides a faster and more compact tehhnique for parsing in a data processor than has been available in the prior art.

The parser invention has several features which make it unique and which give it the advantage over previous technology, including a procedural grammatical description, a bi-directional list data structure, an emphasis on analyzing the structure of verb, noun, and propositional phrases, and language specific morphological analysis to handle particularities of several languages.

DESCRIPTION OF THE FIGURES

These and other objects, features and advantages of the invention will be more fully appreciated with reference to the accompanying figures.

FIGS. 7 through 17 are syntax diagrams of valid verb sequences in English,

FIG. 13 shows the association of paradigm numbers with word forms.

FIG. 14 shows levels of synonym support.

FIG. 15 shows the clause analysis step 34 in greater detail.

DISCUSSION OF THE PREFERRED EMBODIMENT

Figure 1:
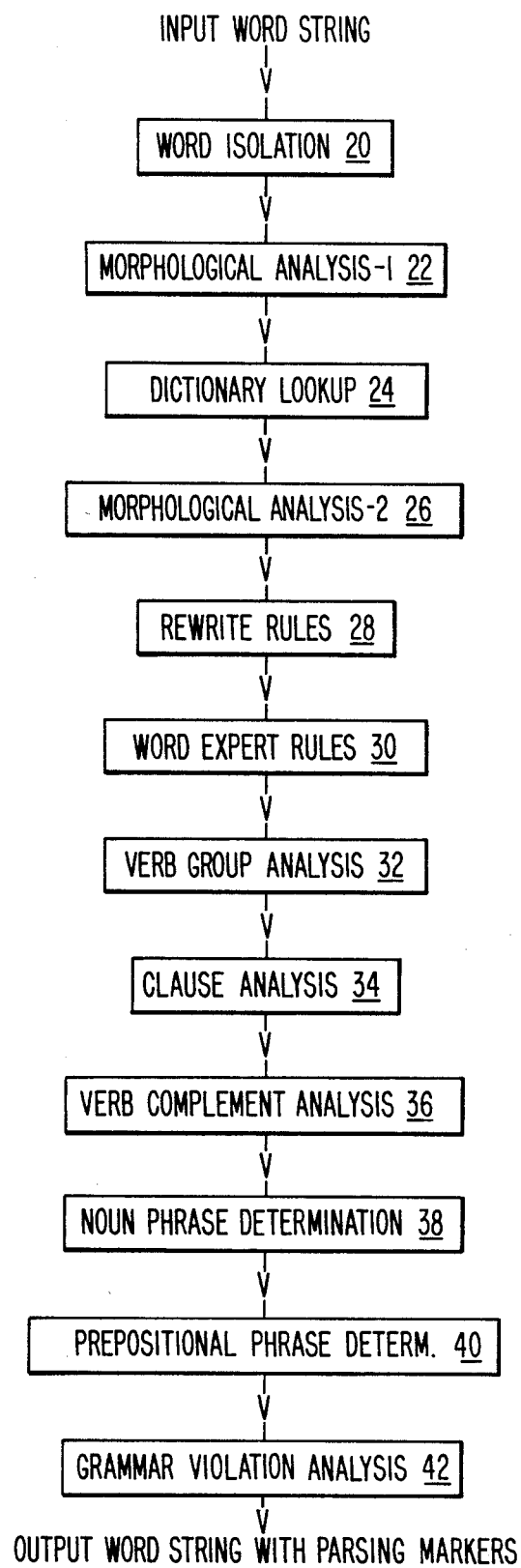
FIG. 1 is a general flow diagram for parsing in accordance with the invention.

The parser invention is a computer executable method to identify both the part of speech of words in the sentence and the grammatical structure or phrase structure of a sentence. Examples 1 through 7 show some of the operations of the invention. In Example 1 the invention will display underlining with dots to indicate noun phases or prepositional phases and the underlining with dashes to indicate verb phases or verb groups. Under each word is also displayed the part of speech. The parts of speech which can be identified and displayed are "A" for adverb, "J" for adjective, "N" for Noun, "C" for conjunction, "P" for pronoun, "V" for verb, "R" for preposition, "I" for interjection, "X" for auxiliary verb, and "Q" for determiner.

EXAMPLE 1

| "The rain in Spain stays mainly in the plain" | | | | | | |
|---|---|---|---|---|---|---|
| Q | N | R N | V | A | R Q | N |
|  | M1 | Z62 | Z1 |  | Z35 | N2 |

Example 2 is an application of the parser invention where words that have different pronunciation, are given different parts of speech based on their sentence structure. The word "documents" is a noun and also a verb.

Example 2

| "John files documents but Mary documents files." | | | | | | |
|---|---|---|---|---|---|---|
| N | V | N | C | N | V | N |
|  | Z1 | Z2 |  |  | Z1 | Z2 |

In Example 2a "I record a record in record time", parsing gives a part of speech for "record" which enables the implementation of voice synthesis applications when access to pronunciation dictionaries is based on both the word form and the part of speech.

EXAMPLE 2a

| "I record a record in record time." | | | | |
|---|---|---|---|---|
| P V | Q N | R J | N |  |
| Z1 | N2 | Z9 N5 | N2 |  |

The parsing invention also goes beyond dictionary searching as in Example 3, which illustrates that proper names and technical terminology which is not included in the dictionary can be identified on the basis of proximity clues as well as morphological clues.

EXAMPLE 3

| "Dr. Gorkh hydrogenated the residue with a platinum catalyst." | | | | | |
|---|---|---|---|---|---|
| N N | V |  | Q N | R | Q N | N |
| D0 | Z1 |  |  |  |  |

Example 4, is a quote from Lewis Carroll, "slythy toves did gyre and gymble in the wabe", which illustrates some of the deductions that are made by the invention in identifying the role of the words. For example, the word "did" which is an auxiliary verb is adjacent to the word "gyre" this forms a verb group. Since the conjunction "and" following "gyre" indicates that like things are joined together, therefore the word "gymble", even though it is not in the dictionary, is assumed to be a verb. The preposition "in" and the article "the" are identified and then the word "wabe" is assumed by the invention to be a noun due to its occurrence in a noun phase. Finally, "slythy toves" which occur between the beginning of the sentence and the verb are assumed by the invention to be the subject, and therefore, an adjective and a noun.

EXAMPLE 4

| "slythy toves did gyre and gumble in the wabe." | | | | | | |
|---|---|---|---|---|---|---|
| J | N | X V | C | V | R Q | N |
| M6 | N2 | V4 V7 |  | Z1 | Z35 | D1 |

The parser invention is also capable of supporting grammar checking applications. Example 5, shows "me and John will attend a meeting on Thursday". "Me" is an objective pronoun which is found in the subject position and therefore it can be flagged by the invention as the wrong pronoun case.

EXAMPLE 5

| "Me and John will attend the meeting on Tuesday." | | | | | | |
|---|---|---|---|---|---|---|
| P | C | N | X V | Q N | R N |

*wrong pronoun case

The parser invention is also able to handle fragmented input, so that examples commonly found in letters, such as "Dear Mr. Smith" or "Sincerely, John Doe" can be handled appropriately as shown in Examples 6 and 6a.

EXAMPLE 6

"Dear Mr. Smith:"
.............
J    N    N
A21

EXAMPLE 6a

"Sincerely, John Doe"
.........
A      N    N

Another example of grammatical checking performed by the invention is subject verb agreement. In Example 7, "The table and the chair was shipped last week" is recognized by the invention as being grammatically incorrect because the sentence has a compound subject and a singular verb. The sentence can be highlighted by the invention and corrected by either changing the subject or the verb.

EXAMPLE 7

"The table and the chair was shipped last week"
.................................................
Q   N    C   Q   N    X   V      J   N
    M1           M1   V4  V7         N5
                      *1

1Subject verb disagreement

GENERAL DESCRIPTION OF THE PARSER INVENTION

The general flow diagram for parsing in FIG. 1 lists the major steps required to parse. Step 20 is the word isolation step. Word isolation is the process of taking the input stream and isolating the words that compose the input stream. This includes identification of numeric, punctuation, alphabetic words as well as other types of components of the input text. Step 22, is the morphological analysis-1. Morphological analysis-1 is concerned with identification of word components which make it possible to match against a dictionary. In French for example, morphological analysis-1 identifies prefixes in front of nouns and verbs as well as suffixes separated by hyphens following the verbs. The isolation of these word components as additional words makes it possible to match with greater reliability. Step 24 in FIG. 1, is a dictionary look-up step. The dictionary look-up consists of three major stages. The first stage is matching against a large dictionary containing parts of speech. The second stage is matching against a dictionary containing exceptions or extensions to the main dictionary. This second dictionary makes it possible to match compound words like United States, hot dog, etc. The third stage of dictionary look-up consists of identifying abbreviations and examining the context of the periods following abbreviations to make sure that they are abbreviation periods and not end of sentence delimiters. Step 26 describes morphological analysis-2, which is concerned with matching words which failed to match against the enlarged dictionary. In this process, procedures used to match against the endings of words use morphological characteristics that enable us to determine the part speech from partial information about the words. Step 28 describes the rewrite rules which is a set of rules to determine, in context, which part of speech is appropriate for each word and to rule out those parts of speech which are impossible in the particular sentence structure given in the input. The rewrite rules make use of the complement grammar described later. Step 30 describes the word expert rules. The word expert rules are rules that apply to specific words which are highly ambiguous and which require specific semantic and syntactic analysis in order to resolve them. The word expert rules are applied to the most frequent words and only those which have a high degree of ambiguity. The rules themselves contain the factors which are used to determine the part of speech for the word. Step 32 is the verb group analysis. The verb group analysis requires a determination of the verb sequences which are valid for this specific language. Generally we start from an auxiliary verb which is easily determined, then we check subsequent words to see if they are verbs that meet the requirements of the verb grammar.

The determination of the verb groups makes it possible to do the clause analysis that is described in step 34. Step 34 encompasses the clause analysis which consists of verb complement analysis, noun phrase determination, prepositional phrase structure, and grammar violation analysis. Step 36 which is the verb complement analysis looks at each verb and tries to determine the complements of the verb. If a verb is transitive the specific type of complement that the verb takes is sought and appropriately marked. Step 38 builds noun phrases and step 40 builds prepositional phrases. Both of these have a similar structure because the prepositional phrases consist of a preposition followed by a noun phrase. The major problem addressed by the noun phrase determination is to make sure that the adjectives and nouns have the proper agreement so that correct phrases are identified. Finally, step 42 contains a grammar violation analysis. The grammar violation analysis is a determination of grammar rules that have been violated in order to achieve a successful parse. The errors noted are marked by indicating, for example, whether subject verb disagreement, split infinitive, a wrong pronoun case, or other error has occurred. The output of the parsing process is the data structure which was built during the word isolation but now marked with the part of speech and the phrase groupings which enable us to analyze the input text according to the grammatical interpretation provided by the parser.

Figure 2:
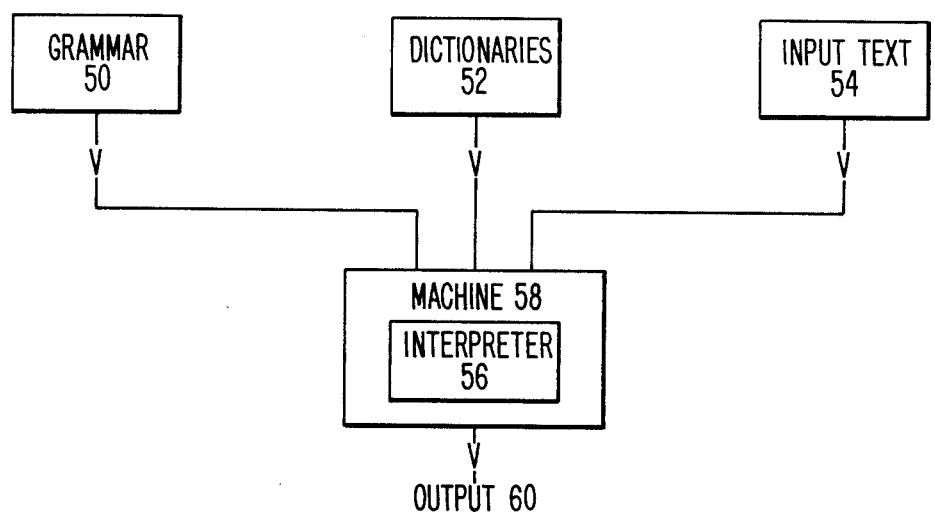
FIG. 2 is a functional block diagram of an interpretive parser.

There are two basic kinds of parsers, interpretive parsers and procedural parsers. The parser invention described herein is a procedural parser, which has many advantages over both prior art interpretive and procedural parsers. An interpretive parser such as shown in FIG. 2 consists of an external grammar function 50, the dictionary function 52, and an interpreter function 56. The function of the interpreter is to run in a data processing machine 58 to process the text 54 and give the desired output 60. The basic function of the system in FIG. 2 is as follows. The interpreter reads in the grammar which is coded in a special language to describe the grammatical structure of input text and then attempts to match, by finding rules within this grammar which apply to the text. The fact that the grammar is external means that this grammar has to have all the descriptive power required for a context sensitive language. This means it has to have features to describe sequence, iteration, and selection. These are the components that are used in modern computer hardware. The interpreter has to be able to interpret all this description and be able to emulate the operations of sequence, iteration and selection, to be able to match the grammar against the input text. The interpreter in essence, is a software representation of specialized hardware, which has to duplicate what a machine capable of interpreting the grammar directly would do. Thus, in the the interpretive approach of FIG. 2, there is an inherent redundancy of the machine executing the interpreter which executes the grammar rules.

Figure 3:
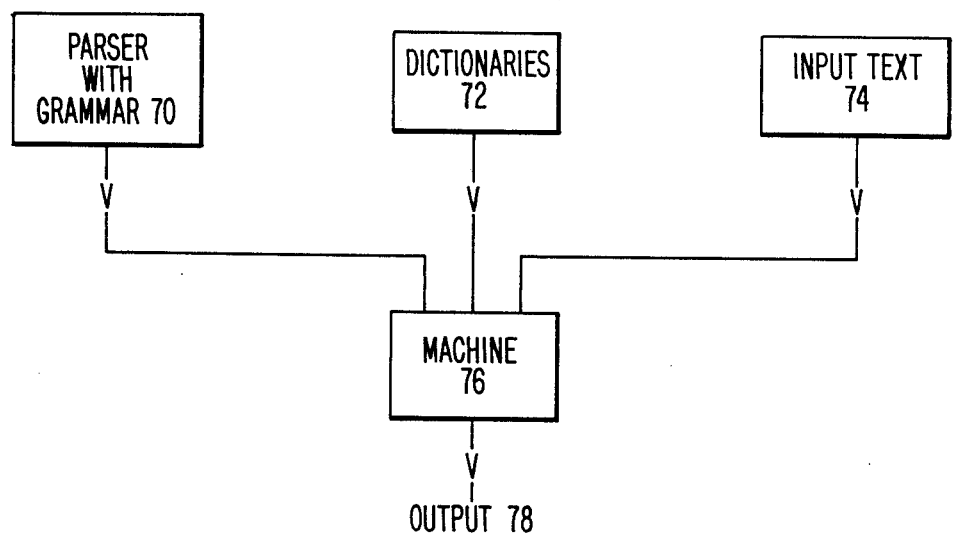
FIG. 3 is a functional block diagram of a procedural parser.

In FIG. 3 there is a description of a procedural parser. The procedural parser avoids the redundancy of the interpretive parser by coding the grammar as a set of computer programs which are directly loadable into the machine. Thus the computer programs 70 can be loaded directly into the machine 76. The machine directly executes the grammatical rules and achieves the same function as an interpreter using much less storage and greater speed. In addition, for the present invention, the dictionaries are organized by frequency so that the most common words are contained in a small dictionary that can be kept resident in memory and the remainder of the dictionary is paged as needed to reduce the storage requirements. It is typical of procedural parsers to run 10 times faster and to use 10 times less memory space than interpretive parsers with equivalent capabilities.

As was mentioned, the function of a parser is to correlate the grammatical rules with input text to find the specific grammar rules which describe the particular input text. There are two kinds of possible failures. One failure can be in the grammar itself, that is, for a particular correct grammatical text, there may not be a corresponding grammar rule to describe it. This is a failure in the grammar. On the other hand, a correct grammar rule which is not able to match against the input text may be caused by incorrect text. This is a grammatical error. The parser has to be able to identify the cases where the text is in error, and at the same time be on guard against failures in the grammar rules which would make it appear that there is an error in text which is actually correct.

DETAILED DESCRIPTION OF THE PARSER INVENTION

Word Isolation Step 20 in FIG. 1.

Word isolation is the process of identifying the words of natural language text. This is by no means a simple task since it requires processing dates and other strings not usually considered "words". A word therefore, is defined as an alphanumeric string (i.e., a string consisting of alphabetic and numeric characters) separated by punctuation. Punctuation consists of all characters which are not alphabetic or numeric such as: $%-&*()_+]:";? ./ and including SPACE. However, several of these characters are not considered punctuation under specific conditions: PERIOD preceded or followed by a numeric character (e.g., 3.1416), HYPHEN preceded and followed by alphanumerics (e.g., F-104, 555-1212), SLASH, COMMA or COLON preceded and followed by numerics (e.g., 11/23/86, 14,321, 8:45). In these cases the punctuation characters are incorporated into the "words".

Another function of the word isolation step is to create the data structure which the parser uses to perform the syntactic analysis. Thus, when the sentence "This is the list" is processed, as each word and its following delimiter (punctuation) is identified, a call is made to the list processing subroutine to add a list node and a string node corresponding to each word and delimiter (if not blank). The details of the List Processing functions are described below. Briefly, if WPTR is a pointer to the word, and LEN is a variable containing its length, the invocation: CALL ALSTR(WPTR,LEN,P1) will allocate a string node whose address is returned in the pointer P1. These string nodes are what is used to represent each "word" in the computer memory.

The invocation CALL INSAFT(P1,BASE,P2) inserts a list node after the node indicated by the BASE pointer. The new list node, whose location is returned in the P2 pointer is set to point to the string node (using the value passed in P1). It is important to notice that since the words themselves are already in the computer memory when the isolation process is executed, it is not necessary to store a copy of the words in the data structure, but rather, only pointers to the words.

Figures 4, 5:
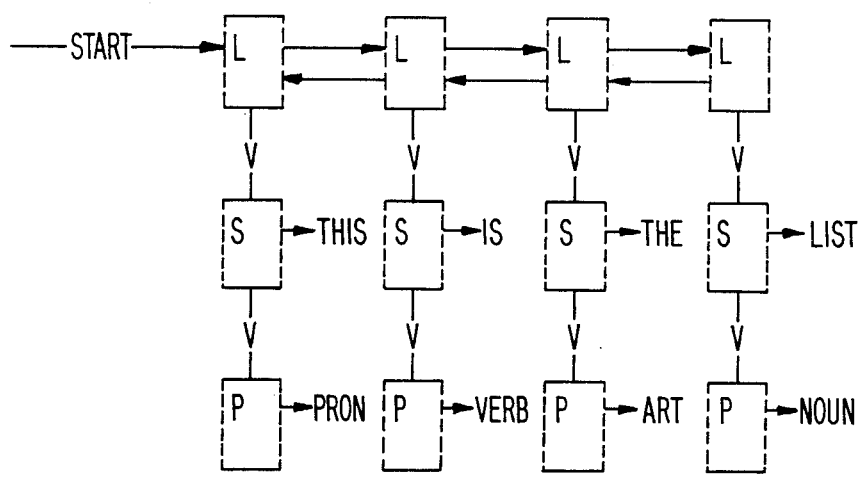
FIG. 4 is a functional block diagram of the word isolation step, providing an example of a list data structure.
FIG. 5 illustrates the general format of the list structure nodes for a list data structure.

The finished data structure consists of the list and string nodes illustrated in FIG. 4. The property nodes which contain the part of speech, etc., are added to the data structure later, during dictionary look-up procedure by involving the ADDP list-processing function and specifying the name and value of the property plus a pointer to the string node with which the property should be associated. In general, all the subsequent work of the parser consists of examining the properties of each word and adding, removing or replacing property values associated with each word.

A list data structure is used to represent the words and the mechanism by which the parser invention outputs the results of the parse to be displayed or otherwise used in subsequent operations. The list data structure is a computer representation that links several entities by means of pointers so they can be manipulated easily. In the parser invention, the list data structure consists of symmetrical list elements. This means the elements can be scanned in either right-to-left or left-to-right direction. Each list element has a pointer to another list element or to a string node. The string node is a descriptor which contains the length of a string, the pointer to the string, and a pointer to the property nodes. This is the representation of the word itself. The pointer to the property nodes is actually a pointer to all the attributes of the word. Each attribute or property has its own name and an associated data value. One of these attributes is part of speech. The attachments of the phrases in the phrase structure are also encoded as attributes. The "phrase" attribute marks the beginning of the phrase or the end of the phrase.

FIG. 4, is an example of a list data structure for the sentence "This is the list". For each word there is a list node L, each list node points to the next list node and to the proceeding list node, so that it is possible to scan a sentence by following the sequence of pointers along the list nodes. Each list node also has a pointer to a string node which identifies the location and the length of each word. And finally the string nodes also point to the attributes of property nodes P which indicate part of speech, phrase markings, etc. It is very important to be able to scan the data structure in both left-to-right and right-to-left sequence because in checking the context of the word it is imperative to be able to look at what has preceded or what follows a word.

In the prior art programming language LISP, which has a uni-directional list structure, it is not possible to back up to a previous node. This creates additional overhead and programming inconvenience to scan text efficiently. In addition to its bi-directional feature, the list data structure in the present invention is also very flexible in that the property nodes or attributes can be added or deleted dynamically. Any number of attributes can be associated with a string node. The interface of the list processing routines of the present invention can easily be imbedded in PL/1, assembler language, or other programming languages, making it possible to migrate the programs to a variety of programming environments.

FIG. 5, shows the constitution of the list structure nodes. Each of the three node types is represented by a 16-byte block. The list nodes consist of system flags and user flags which are used for internal processing. There are three pointers: A pointer to the previous node, a pointer to the next node, and a pointer to an item which can either be another list node or a string node. The string nodes consist of system and user flags, a pointer to the string, a string length element, and a pointer to the property nodes. The property nodes have system and user flags, a code for the property name, a property value, and a pointer to the property nodes. The list processing routines consist of primitives which operate for the nodes at various levels, either list nodes, string nodes, or property nodes. A set of miscellaneous routines are used for other system functions. In terms of the list nodes, it is possible to modify a list by either inserting list nodes it is possible to modify a list by either inserting list nodes before or after any specific node, by deleting list nodes or by replacing list nodes. Some routines make it possible to access the next list node, the previous list node, or to return a pointer to the item to which the list node points. The string node primitives allocate the string nodes and set up the pointers to the strings and the length. Print routines return character strings corresponding to the string nodes. Other primitives fetch the length and pointers for the string nodes.

The property node primitives enable the invention to add properties, delete properties, replace properties, retrieve properties as well as to follow the chain of property values to get as many property nodes as are attached to a specific string node. It is also possible to obtain the property name associated with a property value. The miscellaneous routines enable the invention to allocate storage for the nodes dynamically and to free the dynamically allocated storage. Examples of list node primitives, string node primitives and property node primitives for a list processing program are given as follows:

LIST NODE primitives

INSAFT (INSert AFTer)
Insert a LIST NODE after the LIST NODE whose pointer is given. Return a pointer to the LIST NODE allocated.
INSBEF (INSert BEFore)
Insert a LIST NODE before the LIST NODE whose pointer is given. Return a pointer to the new LIST NODE allocated.
DEL (DELete)
Delete the LIST NODE whose pointer is given. The preceding and following LIST NOTES are linked and the deleted node is freed.
REP (REPlace)
Replace the pointer to item of the LIST NODE whose pointer is given.
NEXT
Return pointer to next LIST NODE.
PREV
Return pointer to previous LIST NODE.
ITEM
Return pointer to item for a LIST NODE.

STRING NODE primitives

ALSTR (ALlocate STRing)
Allocates a STRING NODE. A pointer to the string and the length of the string must be provided. The pointer to the property list is set to NULL, and a pointer to the node is returned.
PRTVAL (PRinT VALue)
Returns a character string corresponding to the STRING NODE.
GETSLEN (GET String LENgth)
Return length of string corresponding to the STRING NODE.
GETSPTR (GET String PoinTeR)
Return pointer to string corresponding to the STRING NODE.

PROPERTY NODE primitives

ADDP (ADD Property)
Given a pointer to a STRING NODE, a property name, and a property value, allocate a PROPERTY NODE and add it to the head of the property list.
DELP (DELete Property)
Given a pointer to a STRING NODE, and a property name delete (unlink) the first PROPERTY NODE with the property name and free the deleted node.
REPP (REPlace Property)
Given a pointer to a STRING NODE, a property name, and a property value, replace the property value of the first PROPERTY NODE whose property name matches. If the property name does not match this is the same as Add __property.
GETP (GET Property)
Given a pointer to a STRING NODE and a property name return the property value associated with the first PROPERTY NODE whose property name matches. LOW(4) is returned if property name does not match.
GETMNE (GET MNEmonic code)
Map a property name code value and return a property name.
NEXTP (get NEXT Property)
Given a pointer to a STRING NODE or to a PROPERTY NODE, return a pointer to the next PROPERTY NODE.
PROPN (get PROPerty Name)
Given a pointer to a PROPERTY NODE, return the property name.
PROPV (get PROPerty Value)
Given a pointer to a PROPERTY NODE, return the property value.

Miscellaneous routines

FREEALL (FREE ALL dynamic storage)
Frees all the storage allocated for list, string, and property nodes.
GET16 (GET 16-byte work area)
Allocate storage for a node. The storage is allocated dynamically in 16K units and node storage is obtained from these units.
PLOABND
Provide diagnostic information when list processing errors occur.
DUMPN (DUMP Node)
Provide a hexadecimal dump of a node to the screen.

The following Table I, parts a, b, c, and d is an example of a program, written in the PL/I language, to perform list processing in accordance with the invention.

TABLE I,

Declaration of subroutine entry points in PL/i

| DCL ADDP | ENTRY (PTR, CHAR(32) VAR, CHAR(4)) | RETURNS (PTR); |
|---|---|---|
| DCL ALNUM | ENTRY (FIXED BIN(31)) | RETURNS (PTR); |
| DCL ALSTR | ENTRY (PTR, FIXED BIN(31)) | RETURNS (PTR); |
| DCL COPY | ENTRY (PTR) | RETURNS (PTR); |
| DCL DEL | ENTRY (PTR) | RETURNS (PTR); |
| DCL DELP | ENTRY (PTR, CHAR(32) VAR) | RETURNS (PTR); |
| DCL DUMPN | ENTRY (PTR); | |
| DCL FREEALL | ENTRY (PTR); | |
| DCL GETMNE | ENTRY (CHAR(32) VAR) | RETURNS (CHAR(4)); |
| DCL GETNAME | ENTRY (CHAR(4) | RETURNS (CHAR(32) VAR); |
| DCL GETP | ENTRY (PTR, CHAR(32) VAR) | RETURNS (CHAR(4)); |
| DCL GETSPTR | ENTRY (PTR) | RETURNS (PTR); |
| DCL GETSLEN | ENTRY (PTR) | RETURNS (FIXED BIN(31)); |
| DCL INSAFT | ENTRY (PTR,PTR) | RETURNS (PTR); |
| DCL INSBEF | ENTRY (PTR,PTR) | RETURNS (PTR): |
| DCL ITEM | ENTRY (PTR) | RETURNS (PTR); |
| DCL NEXT | ENTRY (PTR) | RETURNS (PTR); |
| DCL NEXTP | ENTRY (PTR) | RETURNS (PTR); |
| DCL PREV | ENTRY (PTR) | RETURNS (PTR); |
| DCL PROPN | ENTRY (PTR) | RETURNS (CHAR(32) VAR); |
| DCL PROPV | ENTRY (PTR) | RETURNS (CHAR(4)); |
| DCL PRTVAL | ENTRY (PTR) | RETURNS (CHAR(500) VAR); |
| DCL REP | ENTRY (PTR, PTR) | RETURNS (PTR); |
| DCL REPP | ENTRY (PTR, CHAR(32) VAR, CHAR(4)) | RETURNS (PTR); |

```
* PROGRAM TO ILLUSTRATE USE OF LIST PROCESSING SUBROUTINES */
LSPDR: PROCEDURE OPTIONS(MAIN) REORDER;

DEFAULT RANGE(*) STATIC;
DCL   INCR(0:8000) CHAR BASED;
DCL   CARD CHAR(80);
DCL   VWORD CHAR(80) VAR;
DCL   (DOCPT, LISTBASE, Pl, P2, P3, X1) POINTER INIT(NULL);
DCL   (CA,CB) CHAR(500) VAR;
DCL   (ICUR, BPOS, LEN) FIXED BIN (15) INIT(0);
DCL   (IWORD, LWORD) FIXED BIN(31) INIT(0);
DCL   DOCUMENT CHAR(8000) VAR INIT('');
DCL   (ADDR, INDEX, LENGTH, NULL, SUBSTR, VERIFY) BUILTIN;
DCL   ALSTR EXTERNAL ENTRY (PTR,FIXED BIN(31)) RETURNS(PTR);
DCL   DUMPN EXTERNAL ENTRY (PTR);
DCL   INSAFT EXTERNAL ENTRY (PTR,PTR) RETURNS(PTR);
DCL   REP EXTERNAL ENTRY (PTR,PTR) RETURNS(PTR);
DCL   NEXT EXTERNAL ENTRY (PTR) RETURNS(PTR);
DCL   ITEM EXTERNAL ENTRY (PTR) RETURNS(PTR);
DCL   PRTVAL EXTERNAL ENTRY (PTR) RETURNS(CHAR(500) VAR);
/* READ THE INPUT FILE*/
ON ENDFILE(SYSIN) GOTO EOF;
DOCUMENT = ' ';
DO WHILE (1>0);
READ FILE(SYSIN) INTO(CARD);
PUT EDIT(CARD)(SKIP,A);
INREC = INREC + 1;
DOCUMENT = DOCUMENT || CARD;
END;
EOF: DOCUMENT = DOCUMENT || '';       /* ADD TWO TRAILING BLANKS */
LEN = LENGTH(DOCUMENT);
DOCPT = ADDR(DOCUMENT);               /* ADDRESS OF DOCUMENT */
/* ISOLATE WORDS */
ICUR = 1;
DO WHILE(ICUR < LEN);
/* SEEK NON-BLANK */
IF SUBSTR(DOCUMENT,ICUR,1) = ' 'THEN DO;
BPOS = VERIFY(SUBSTR(DOCUMENT,ICUR), ' ');
IF BPOS = 0 THEN GO TO DONE; /* NOT FOUND */
END;
ELSE BPOS = 1;
IWORD = ICUR + BPOS - 1; /* START OF STRING */
/* SEEK BLANK */
LWORD = INDEX(SUBSTR(DOCUMENT,IWORD),' ') - 1;
IF LWORD < = 0 THEN LWORD = LEN - IWORD + 1;
ICUR = IWORD + LWORD;
/* A "WORD" HAS BEEN ISOLATED IN SUBSTR(DOCUMENT,IWORD,LWORD) */
P1 = ADDR(DOCPT->INCR(IWORD+1));    /* ADDRESS OF "WORD" */
P2 = ALSTR(P1, LWORD);                /* ALLOCATE STRING NODE */
P3 = INSAFT(P2,P3);                   /* ADD STRING NODE TO LIST */
IF LISTBASE = NULL THEN                /* SET LISTBASE*/
LISTBASE = P3;
END;
```

TABLE I,-continued

```
DONE:
/* PRINT LIST STRUCTURE */
PUT SKIP;
P1 = LISTBASE;
DO WHILE (P1    = NULL);       /* SCAN LIST STRUCTURE */
CALL DUMPN (P1);               /* PRINT LIST NODE */
P2 = ITEM(P1);                 /* GET POINTER TO STRING NODE */
CALL DUMPN(P2);                /* PRINT STRING NODE */
P1 = NEXT(P1);                 /* POINT TO NEXT LIST NODE */
END;
/* SORT LIST STRUCTURE */
P1 = LISTBASE;
DO WHILE (P1    = NULL); /* SCAN LIST STRUCTURE */
P3 = P1; /* P3 WILL POINT TO LIST NODE FOR LOWEST ENTRY */
CA = PRTVAL(ITEM(P3)); /* GET PRINT VALUE */
P2 = NEXT(P1);
DO WHILE (P2    = NULL);
CB = PRTVAL(ITEM(P2));
IF CB < CA THEN DO;
P3 = P2;        /* SAVE POINTER TO LOWER ENTRY */
CA = CB;        /* SAVE LOWER PRINT VALUE */
END;
P2 = NEXT(P2);
END;
/* IF P1 WAS NOT THE LOWEST ENTRY, EXCHANGE POINTERS TO
ITEM FOR LIST NODES AT P1 AND P3 */
IF P1    = P3 THEN DO;
P2 = ITEM(P1);
X1 = REP(P1,ITEM(P3));    /* P1 NOW POINTS TO LIST NODE WITH
                             LOWEST STRING NODE VALUE */
X1 = REP(P3,P2);          /* LIST NODE AT P3 NOW POINTS TO
STRING NODE PREVIOUSLY POINTED TO BY LIST NODE AT P1 */
END;
P1 = NEXT(P1);            /* GET POINTER FOR NEXT LIST NODE */
END;
/* PRINT SORTED LIST STRUCTURE */
DISPLAY('--PRINT SORTED LIST--');
P1 = LISTBASE;
DO WHILE (P1    = NULL);   /* SCAN LIST STRUCTURE */
CALL DUMPN(P1);            /* PRINT LIST NODE */
P2 = ITEM(P1);             /* GET POINTER TO STRING NODE */
CALL DUMPN(P2);            /* PRINT STRING NODE */
P1 = NEXT(P1);             /* POINT TO NEXT LIST NODE */
END;
END LSPDR;
```

Morphological Analysis-1 (Step 22 in FIG. 2).

Morphological Analysis-1 (MA1) is concerned with identification of word components which need to be considered as separate words before matching against a dictionary. The morphological analysis-1 for French, for example, identifies prefixes in front of nouns and verbs so that strings like "qu'une", "s'articule", "l'accent" are separated into two different words: "qu'"+"une", "s'"+"articule", and "l'"+"accent", respectively. Similarly, some pronominal verb suffixes are also separated from the verb form; thus, "donnez-le-moi", "doit-il" are separated into "donnez"+"-le-moi" and "doit"+"-il", respectively. Word separation is accomplished by shortening the length indicated in the original string node and inserting a new node with the remainder of the string by invoking the INSAFT list- processing function. At the time that the division of the words is effected, a preliminary part of speech is associated with the known component whether it is a prefix or a suffix. Thus, "c'" is marked as a pronoun, "d'" as a preposition, the hyphenated pronouns "-il", are marked as such, etc. based on tables which list the prefixes, suffixes, and their parts of speech. As indicated earlier, the part of speech is represented as a property node in the list data structure; the value of the property is stored within the node and may contain four bytes of information describing the part of speech (noun, verb, adjective, etc.) several of which may occur simultaneously.

Dictionary Lookup (Step 24 in FIG. 1).

The large dictionary is stored in compact form by encoding the length of the common leading substrings of adjacent dictionary entries and by indicating variants of the terms through the use of suffix numbers. Thus, the dictionary entries "bang" and "bank" would be coded like: "bang"@V1, 3"k"@V1. The code @V1 is used to represent the list of endings "s", "ed", "ing" which can be added to the word bang to create "bangs", "banged" and "banging". The word "bank" is represented by 3"k" where "3" indicates that the first three characters are the same as the preceding word (i.e., "ban") to which a "k" is added. The same list of suffixes applies to this word. One or more parts of speech are associated with each word or suffix in the dictionary, so that upon retrieval of a word the parts of speech can also be retrieved. The word "bank" , for instance, would have both a verb and a noun part of speech associated with it, whereas "banked" constructed from by addition of a suffix from list @V1 would only be a verb. The format of the dictionary is not relevant to the parsing process; what is important is being able to retrieve the part of speech associated with each word in the dictionary as fast as possible.

The second dictionary (used to extend the main dictionary) contains multiple word terms or terms which contain unusual parts of speech. The term "United States", for example, is initially represented as two separate words in the list data structure. When these two adjacent words are matched against the second dictionary, the matching procedure creates a single "word" by increasing the length contained in the first string node and deleting the following string node. From this time forward, the terms will be considered to be one word by any of the programs that follow. The part of speech contained in this second dictionary is encoded associated with the term (e.g., "UNITED STATES :N") where the colon indicates that the part of speech follows; the code "N" indicates a noun. Articles, auxiliary verbs, and determiners are contained in this dictionary since they form small closed classes which require parts of speech which are not included in the large dictionary.

Morphological Analysis-2 (Step 26 in FIG. 2)

Morphological Analysis-2 (MA2) is applied to words which failed to match against the dictionary or have peculiar features. MA2 differs from MA1 in that MA1 identifies word components marked by apostrophes, hyphens or other salient punctuation features. MA2, on the other hand, examines words that have no unusual punctuation clues and on the basis of the word endings or prefixes assigns the part of speech. For example, if the word "spectoscopically" is encountered in the text, MA1 will not do anything because the word has no internal punctuation; then, the dictionary match will fail because the word is misspelled; however, since the word has an "LY" ending, it will be assigned an adverb part of speech by MA2.

In the Morphological Analysis-2, a list of suffixes is matched against the words which failed to match in the dictionary. This table contains suffixes along with the part of speech that is commonly associated with the suffix. Refer to Table II, which shows the parts of speech commonly associated with specific morphological characteristics for English words, in the invention. For example "tion" generally indicates a noun N as in the word "nation". The suffix "ness" is also indicative of a noun as in the word "boldness", but "ed" endings are typically verb V endings. Morphological examination of words by the invention, is very useful for technical vocabulary such as the word "hydrogenated" which may not be in the main dictionary. Similarly, the "ly" ending is typical of an adverb A and "n't" is normally indicative an auxiliary verb followed by a contraction of the word "not". An ending such as "ate" could be an adjective J, noun, or a verb. For example, "zirate" is an adjective, "nitrate" is a noun, and "tolerate" is a verb. As part of morphological processing prefixes such as "anti", "post" or "pre" are also checked as they imply adjectival or nominal attributes of a word. Morphological analysis for English looks at the use of the "'s" since it can be a contraction of the verb "to be" or an indication of a possessive noun. The context of the "'s", needs to be checked to determine if it is a pronoun as in "let's" or a verb as in "here's Johnny". The morphological routines separate "'s" as a separate word if it is a pronoun or a verb whereas they will leave it as part of the same word if it is a possessive ("John's"). Other types of morphological processing include contractions like "'d" for "would", "'ve" for "have", "'ll" for "will", etc.

TABLE II

| 'TION' | N | 'IC' | J |
| --- | --- | --- | --- |
| 'MENT' | N | 'AL' | J |
| 'ITY' | N | 'ORY' | J |
| 'ISM' | N | 'ARY' | J |
| 'NESS' | N | 'EST' | J |
| 'OGY' | N | 'ISH' | J |
| 'ED' | V | 'LESS' | J |
| 'ING' | V | 'LY' | A |
| 'IZE' | V | 'OUS' | J |
| 'ATE' | JNV | 'THY' | J |
| 'FUL' | J | 'IZES' | V |
| 'IBLE' | J | 'ATES' | NV |
| 'ABLE' | J | 'N"T' | X |
|  |  | 'S' | NV |

Rewrite Rules (Step 28 in FIG. 1).

Figure 6:
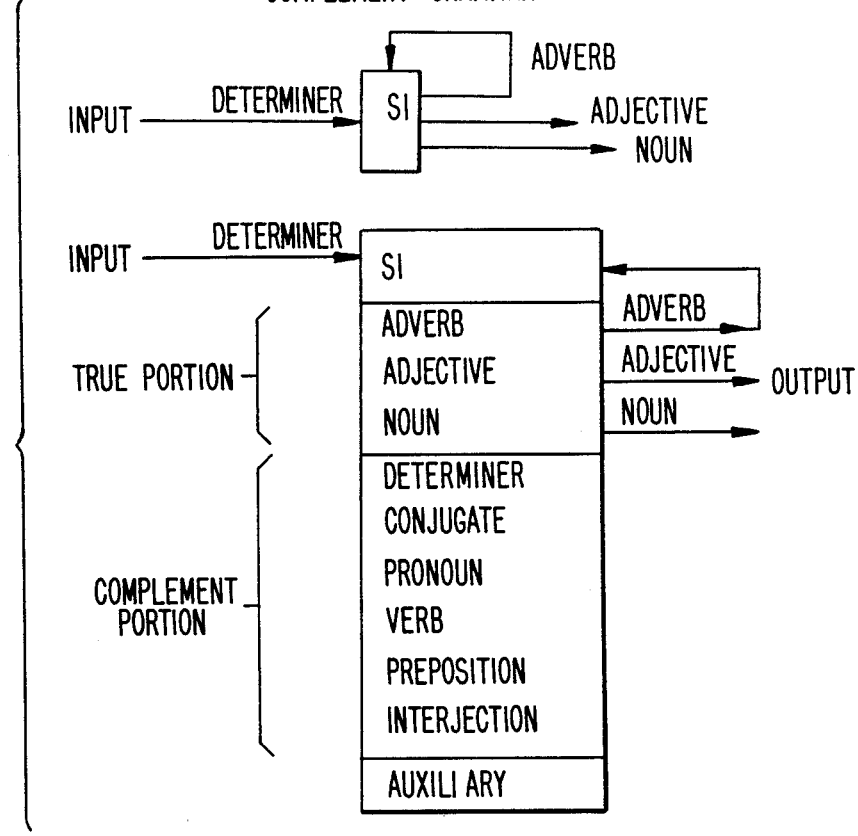
FIG. 6 is a conceptual diagram of a complement grammar.

One of the innovations of the present parser invention is the structure and implementation of the complement grammar. FIG. 6 is a state diagram for the invention which shows a determiner going into state 1 (S1) from which it is possible to continue in state 1 by having an adverb or to go to another state by having an adjective or a noun. The way that the parser invention interprets this type of diagram is by considering the complete set of parts of speech which include adverb, adjective, noun, determiner, conjunction, pronoun, verb, preposition, interjection, and auxiliary. Since only adverb, adjective and noun are valid outputs from state 1, the complement is the remainder of the parts of speech. As an example, consider the phrase "a Ship" where "a" is a determiner and "ship" can be both a noun and a verb. The complement grammar approach of the invention requires it to recognize that this meets the grammatical constraints of the state diagram, but the invention is also forced to remove the verb part of speech from "ship" since it is a complement of the allowable classes that can follow from state 1. Thus, "a ship" can only be a determiner followed by a noun and the verb part of speech for "ship" is removed when the invention exits from state 1. The complement grammar eliminates the complement of the allowable parts of speech whenever the invention exits any of the states of the grammar.

The implementation of the complement grammar rules is accomplished by accessing the property nodes associated with the string nodes in the data structure through the list processing functions. The invocation CALL ITEM(P1,P2) returns the address of the string node in P2 when P1 points to its list node. Subsequently CALL GETP(P2,PNAME@,POS@) retrieves the part of speech and returns it in the variable POS; for this to happen, P2 must point to the string node, POS@must point to the 4-byte POS variable, and PNAME@must point to the "property name" (which is an 8-byte tag kept by the list processing subroutines containing in this case "P.O.S. " to indicate part of speech). When this is done for the next word and its part of speech stored in NPOS then one of the rules needed to implement the complement grammar in FIG. 6 can be accomplished by the statement: IF POS(BDET) & NPOS(BNOUN) & NPOS - =NOUN THEN NPOS =NOUN; which states that a determiner followed by a word which is marked as a noun and as something else (any other part of speech) should result in changing the part of speech of the second word to noun thereby erasing the other parts of speech. The notation used for this example assumes that the parts of speech are encoded as bit strings.

Word Expert Rules (Step 30 in FIG. 1).

One word handled by the word expert rules is "when". This word can be either an adverb or a conjunction depending on how it is used. "WHEN" is a conjunction in the sentence "WHEN HE COMES, BE READY", however, it is an adverb in the sentence "WHEN WILL WE LEAVE?" and "HE KNOWS WHEN TO LEAVE". "WHEN" can also be a pronoun in "SINCE WHEN HAS HE HAD IT?". The word expert rules make use of any contextual information, including semantic clues to try to resolve the part of speech. In some cases, if a resolution can not be reached, the statistically most likely possibility is assigned; also, when possible, the part of speech of adjacent words is also resolved.

Some of the rules used to disambiguate the word "WHEN" are: (1) If "when is followed by the end of sentence, by an infinitive, or by an auxiliary verb then it is an adverb. (2) If "when" is preceded by "since" or is followed by a period or a non-parenthetical comma then it is a pronoun. (3) Otherwise, "when" is a conjunction. These rules are implemented using the list-processing subroutines to access and modify the part of speech property node as necessary.

Verb Group Analysis (Step 32 in FIG. 1).

FIGS. 7 through 12 are state diagrams representing simplified valid verb groups for English. The basic problem solved by these state diagrams is to organize the identification of verb groups in a coherent manner within the parser. The function of the state diagrams is to guide the verb group analysis procedure and is best understood by working through specific examples. When we try to parse a sentence such as "JOHN WILL BE GOING TO SCHOOL TOMORROW", the occurrence of the auxiliary verb "WILL" triggers the parser to use the state diagram in FIG. 7 because box 80 has a set of model auxiliaries which includes "WILL". At this point the verb group analysis checks the next word in the sentence. Since the next word is "BE" and it matches Box 84, the parser expects the word following "BE" to be either a word which is not a verb or a verb of the class represented by Box 86 (past participle or present participle). When the word "GOING" is encountered, access to the part of speech indicates that it is a verb. At this point the verb group analysis invokes a Paradigm Based Morphological Text Analysis, described below, which returns a variable containing the verb categories. Since "GOING" is a present participle, the word is incorporated into the verb group. At this point the verb group analysis has reached the end of the state diagram and the verb group is complete. The verb group analysis procedure adds a "PHRASE" property node to the data structure at the first and last word of the verb group. The value of the first one is "BV" to indicate the beginning of the verb group and "EV" to indicate the end of the group. From this time the three words "WILL BE GOING" will be considered as a single verb unit. If the test sentence had been "JOHN WILL BE IN SCHOOL TOMORROW" then, instead of proceeding to Box 86, the process would have finished when the word "IN" was encountered and the verb group would have been "WILL BE".

FIGS. 7 through 12 are simplified in the sense that they do not indicate adverbial and parenthetical inclusions. For example, "JOHN WILL NOT BE IN SCHOOL TOMORROW" imbeds the adverb "NOT" in the verb group. Similarly, "JOHN WILL, AS FAR AS I KNOW, BE IN SCHOOL TOMORROW" imbeds a parenthetical phrase within the verb group. The verb group analysis procedure has to allow for imbedding phenomena and for ellipsis such as "JOHN WILL WINE AND DANCE HIS DATE" where the verb group "WILL WINE AND DANCE" is interpreted as "WILL WINE AND WILL DANCE" even though the second auxiliary is missing. The implementation of these features in the verb group analysis requires skipping adverbs, parenthetical phrases and coordinating conjunctions when going from one box to another in FIGS. 7 through 12. Thus, the verb phrase "MAY NOT BE QUICKLY DONE" contains adverbs between components that correspond to Boxes 80, 84, and 86 of FIG. 7. Before discussing FIGS. 8 through 12, a description follows of Paradigm-based Morphological Text Analysis.

The paradigm-based system of text analysis used in the verb group analysis step 32, provides a mechanism for classifying natural language text and for generating word forms for that text based on word morphology. Its mechanisms are extensible and can be applied to many natural languages.

A paradigm is a model that shows all the forms that are possible for a word. This may include all forms that can be generated by suffixation as well as those that can be generated by prefixation. A distinction is made herein between a "basic paradigm process" that may be used to generate a standard word form (or lemma) from any form of the word, and a "generative paradigm process" that can be used to generate all word forms from the lemma and the paradigm.

In the basic paradigm process, an input word is processed against a reference paradigm to produce a standard word form (or lemma) and a list of grammatical categories.

Table III is a paradigm used for many regular English verbs and Table III A is a paradigm for regular English nouns. The grammatical classes are given in the left column, and the morphological characteristics are indicated in the right column. In addition, the heating of the paradigm contains an identifying number and an example.

The basic paradigm process consists of matching the morphological characteristics of the paradigm against an input word (to which the particular paradigm is applicable).

TABLE III

| TABLE REGULAR VERB PARADIGM | |
|---|---|
| paradigm: V45 | example: park |
| * IMPERSONAL | |
| infinitive | — (lemma) |
| pres. participle | ing |
| past participle | ed |
| * PRESENT TENSE | |
| pres1 | — |
| pres2 | — |
| pres3 | s |
| pres4 | — |
| pres5 | — |
| pres6 | — |
| * PAST TENSE | |
| pasi1 | ed |
| pasi2 | ed |
| pasi3 | ed |
| pasi4 | ed |
| pasi5 | ed |
| pasi6 | ed |

TABLE IIIA

ENGLISH REGULAR NOUN PARADIGM

| paradigm: N27 | example: book |
|---|---|
| singular | — (lemma) |
| plural | s |

TABLE III A — ENGLISH REGULAR NOUN PARADIGM

The basic paradigm process is applied as follows: Given an input word such as "books" and a reference paradigm number "N27" Table III A, we match the morphological characteristics of the paradigm against the work. In this example, the final "s" matches, indicating that the input word is a plural noun; this information is placed in the list of grammatical classes. The lemma is generated by replacing the "s" with a blank (represented in the paradigm table as an underscore). The resulting lemma is "book" which is the singular form of the noun.

If we apply paradigm number "V45" (TABLE III) to the same input word, the basic paradigm process indicates that the word is the present tense of a verb applicable to the third person. This is illustrated in the sentence "He books a flight to Boston". The lemma is generated as form the previous example, but corresponds to the infinitive form of the verb.

TABLE IV illustrates a paradigm for an English irregular verb form. TABLES V and VI are paradigms for examples of Spanish regular verbs and Spanish regular nouns. Although the morphology for Spanish is more complicated, the same basic procedure described above is used.

The replacement mechanism used to generate the lemma is very general. It is applicable even for cases where complete word replacement is required because no morphological features are shared (as in the forms of the verb "be": be, am, is, etc.).

TABLE IV

EXAMPLE OF ENGLISH IRREGULAR VERB PARADIGM

| paradigm: V4c | example: find |
|---|---|
| **\* IMPERSONAL** | |
| infinitive | ind (lemma) |
| pres. participle | inding |
| past participle | ound |
| **\* PRESENT TENSE** | |
| pres1 | ind |
| pres2 | ind |
| pres3 | inds |
| pres4 | ind |
| pres5 | ind |
| pres6 | ind |
| **\* PAST TENSE** | |
| pasi1 | ound |
| pasi2 | ound |
| pasi3 | ound |
| pasi4 | ound |
| pasi5 | ound |
| pasi6 | ound |

TABLE V

EXAMPLE OF SPANISH REGULAR VERB PARADIGM

| paradigma: V01 | ejemplo: amar |
|---|---|
| **\* FORMAS NO PERSONALES** | |
| infinitivo | ar (lemma) |
| gerundio | ando |
| participio | ado |
| **\* MODO INDICATIVO** | |

TABLE V-continued

EXAMPLE OF SPANISH REGULAR VERB PARADIGM

| paradigma: V01 | ejemplo: amar |
|---|---|
| **\* presente** | |
| pres1 | o |
| pres2 | as |
| pres3 | a |
| pres4 | amos |
| pres5 | ais |
| pres6 | an |
| **\* preterito imperfecto** | |
| pasi1 | aba |
| pasi2 | abas |
| pasi3 | aba |
| pasi4 | abamos |
| pasi5 | abais |
| pasi6 | aban |
| **\* preterito perfecto simple** | |
| pasp1 | e |
| pasp2 | aste |
| pasp3 | o |
| pasp4 | amos |
| pasp5 | asteis |
| pasp6 | aron |
| **\* futuro** | |
| futu1 | are |
| futu2 | aras |
| futu3 | ara |
| futu4 | aremos |
| futu5 | areis |
| futu6 | aran |
| **\* condicional** | |
| cond1 | aria |
| cond2 | arias |
| cond3 | aria |
| cond4 | ariamos |
| cond5 | ariais |
| cond6 | arian |
| **\* MODO SUBJUNTIVO** | |
| **\* presente** | |
| spre1 | e |
| spre2 | es |
| spre3 | e |
| spre4 | emos |
| spre5 | eis |
| spre6 | en |
| **\* preterito imperfecto** | |
| spai1 | ara,ase |
| spai2 | aras,ases |
| spai3 | ara,ase |
| spai4 | aremos,asemos |
| spai5 | arais,aseis |
| spai6 | aran,asen |
| **\* futuro** | |
| sfut1 | are |
| sfut2 | ares |
| sfut3 | are |
| sfut4 | aremos |
| sfut5 | areis |
| sfut6 | aren |
| **\* MODO IMPERATIVO** | |
| impe1 | — |
| impe2 | a |
| impe3 | e |
| impe4 | emos |
| impe5 | ad |
| impe6 | en |

TABLE VI

EXAMPLE OF SPANISH REGULAR NOUN PARADIGM

| paradigma: N04 | ejemplo: amo |
|---|---|
| msing | o (lemma) |
| mplur | os |
| fsing | a |
| fplur | as |

The preceding illustrated the basic paradigm process to produce the lemma. The following presents the methodology of the generative paradigm process which is used to produce all word forms from a lemma and a paradigm; this is the basis for building a dictionary of word forms and their corresponding paradigm reference.

Figure 13:
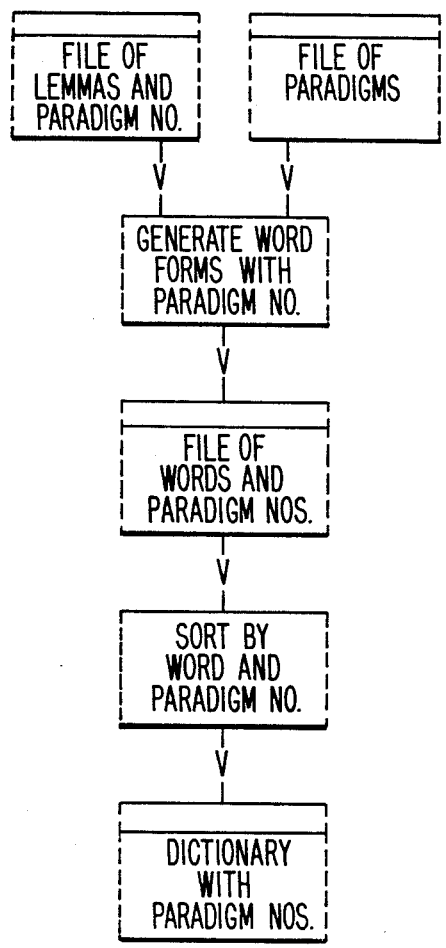

FIG. 13 illustrates how a file of lemmas and their corresponding paradigm numbers (references) can be processed against a file containing the paradigms to produce a file of words and paradigm numbers. After sorting and removing duplicates, this file can be used as a reference dictionary against which vocabulary from any text can be matched to retrieve the paradigm numbers. It is then possible to obtain the lemma for each text word by application of the basic paradigm procedure.

The details of the generative procedure are the same as for the basic procedure, but rather than having to scan all the morphological entries in the paradigm for a match, only the morphology of the lemma is examined to identify the linguistic stem to which the rest of the morphological features apply to generate the word forms. As an example, the lemma "grind" and the paradigm number "V4c" (illustrated in Table IV) results in the linguistic stem "gr" from which the unique entries "grind", "grinding", "ground", and "grinds" can be generated. Processing of the lemma "ground" and the paradigm "N27" (Table III A) results in the entries "ground" and "grounds".

The resulting dictionary with paradigm numbers would have the following entries, and the asterisk(*) indicates the lemma.

grind V4c*
grinding V4c
grinds V4c
ground V4c, N27*
grounds N27

The information obtained as part of the basic paradigm-based morphological text analysis process contains grammatical information that not only identifies the part of speech, but also gives the grammatical roles of the words, as used in the verb group analysis step 32. This also makes it possible to use this procedure for grammar checking tasks such as subject/verb agreement, article/noun agreement, and other gender, number and verb-form agreement tasks.

The following are some other applications of paradigm-based text analysis.

Compact Dictionary Representation

It can be used in a list of lemmas and their corresponding paradigms as a compact way of representing a dictionary. This is particularly advantageous for languages that have verbs with a large number of declensions.

Automatic Indexing

The lemma obtained from the basic paradigm process can be used as an index point for natural language text which is independent of the word forms encountered in the text. Similarly, retrieval becomes easier when only the lemmas need to be searched without needing to cope with the uncertainties in vocabulary in unrestricted natural language text.

Synonym Retrieval

Figure 14:
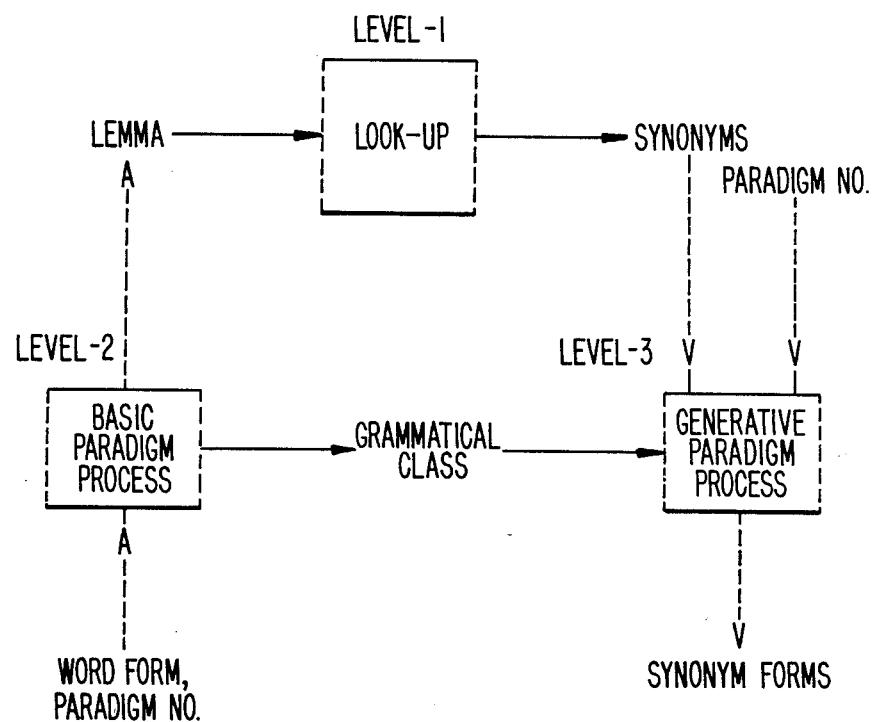

FIG. 14 illustrates three levels of synonym support which are possible using the basic and generative paradigm processes. Level-1, which is the most fundamental level is a traditional look-up based on the lemma. This is how a manual or un-assisted synonym support process works. A person has to provide the lemma.

Level-2 uses the basic paradigm process to convert text words automatically to the lemma. This makes it possible to reference a synonym dictionary automatically in a text-processing task by simply positioning a cursor on a word and pressing a function key. The synonyms retrieved are those that would be found in a synonym dictionary in lemma form.

Level-3 refines the output of the synonym dictionary by generating the forms of the synonyms that correspond to the input word. At this stage the user of a text processing system only needs to select a word form to replace it in the text.

Figure 7:
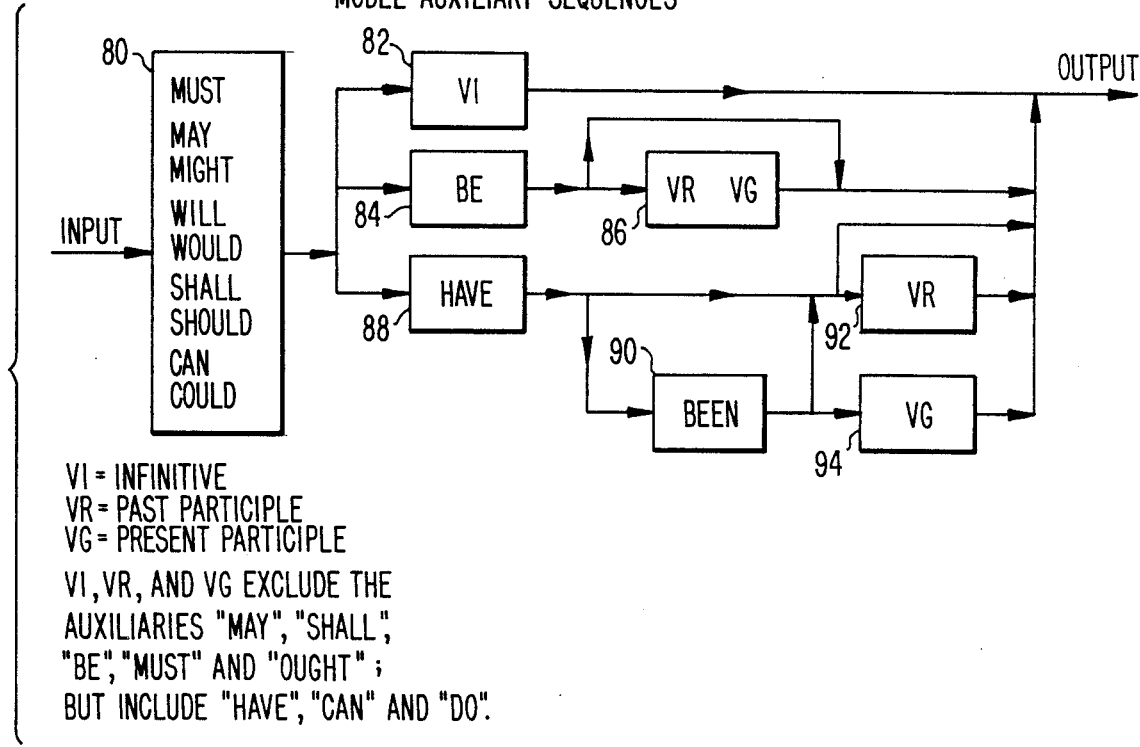
Figure 8:
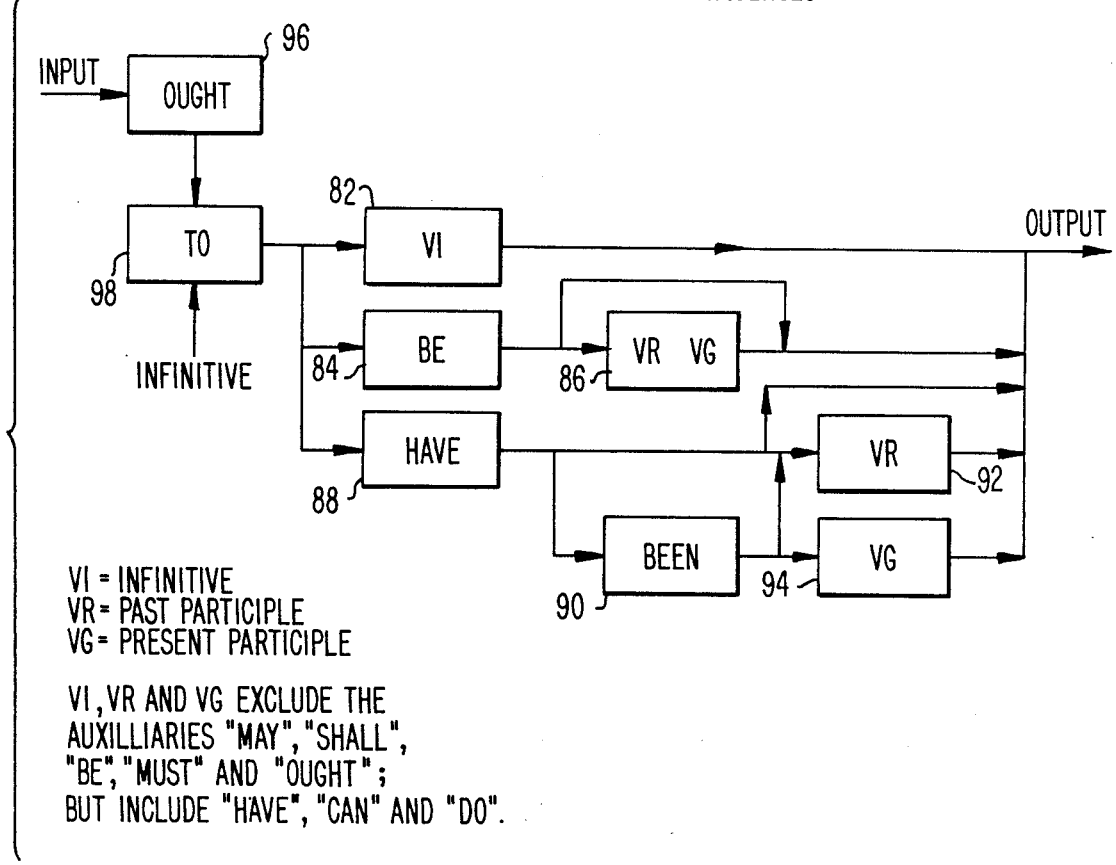
Figure 9:
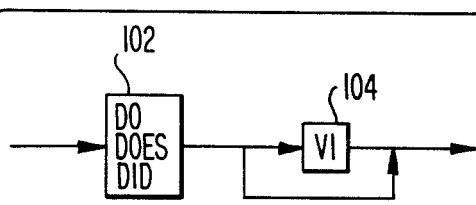
Figure 10:
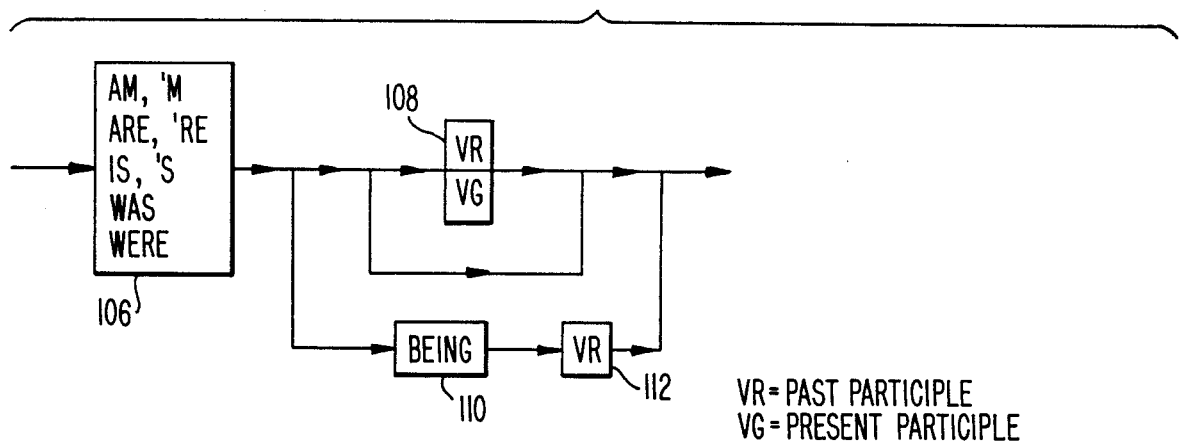
Figure 11:
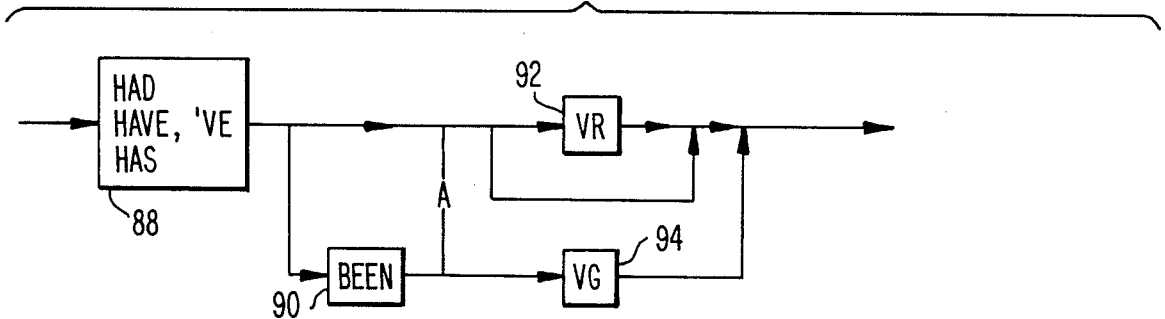
Figure 12:
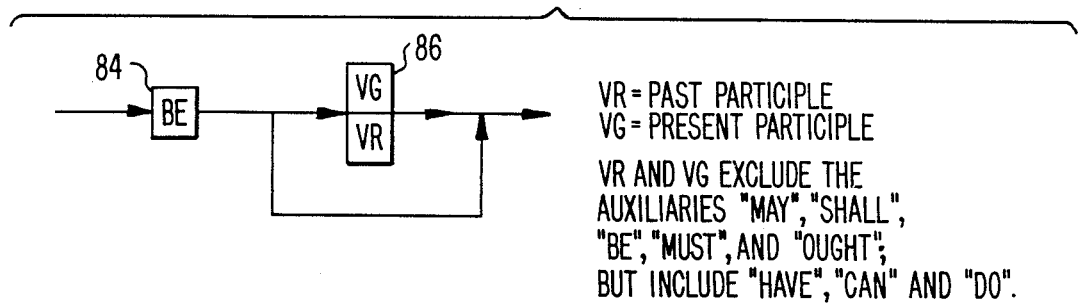

Returning now to the verb group analysis step 32 of FIG. 1, it identifies valid auxiliary verb combinations or sequences as defined by the grammar of the language. For example, FIGS. 7, 8, 9, 10, 11, and 12 are some of the verb sequences which are valid for English. Similar auxiliary verb sequences can be built for other languages. In these figures "VI" indicates an infinitive form of the verb, "VR" the past participle of the verb, and "VG" the present participle. These three categories exclude the auxiliaries "may", "shall", "be", "must" and "ought" but they include "have" "can" and "do". FIG. 7 indicates that the modal auxiliaries "must", "may", "might", "will", "would", their contractions, "shall", "should", their contractions, "can" and "could" can be followed by an infinitive verb form as shown by the arrows from function 80 to function 82. For example, the sequences "must go" or "may go" are valid. Similarly, since function 80 flows to function 84 and subsequently to function 86 the invention can have a verb phrase or verb sequence like "might be going" or "might be gone" as a valid sequence. Also following the path from 80 to 88 to 90 and 92, the invention would have a construction like "may have been gone". If the invention follows the sequence 80, 88, 90 to 94, it would have a sequence like "will have been going" and these are valid sequences with the modal auxiliaries indicated in function 80. Similarly, in FIG. 8, "ought" is followed by a "to" and then a similar arrangement of verb sequences. FIG. 9 is a sequence specific for the verb "do" which only takes the infinitive as illustrated by functions 102 and 104. In FIG. 10 the invention has forms of the verb "be" except for "be" itself. Function 106 includes "am", "are", "is", "was", "were", and their contractions like "'m", "'re", "'s". The sequence from functions 106 through 108 indicates that the invention can have "am going" or "am gone" as valid English sequences. The sequence from 106 to 110 and subsequently 112 indicates that sequences like "am being" or "are being studied" are correct English sequences. FIG. 11 shows the sequences allowable for the verb "have". This includes "had", "have", "has", and "'ve" which is a contraction for have. An example of the flow from function 88 to 90 to 92 is "have been gone". Similarly the flow from 88 to 90 thru 94 is "have been going". Finally FIG. 12 shows that the only verb forms that can follow the word "be" can be the present participle or past participle of a verb, "be gone" or "be going" are examples of the only possibilities for FIG. 12. Although, these are the fundamental sequences in which the verbs can be arranged the invention will also allow adverbs to intervene within any particular sequence particularly after an auxiliary. Referring to the FIGS. 7 to 12, an example such as "may not be gone" where the adverb "not" occurs immediately after the first auxiliary is also a valid sequence.

Clause Analysis (Step 34 of FIG. 1)

Figure 15:
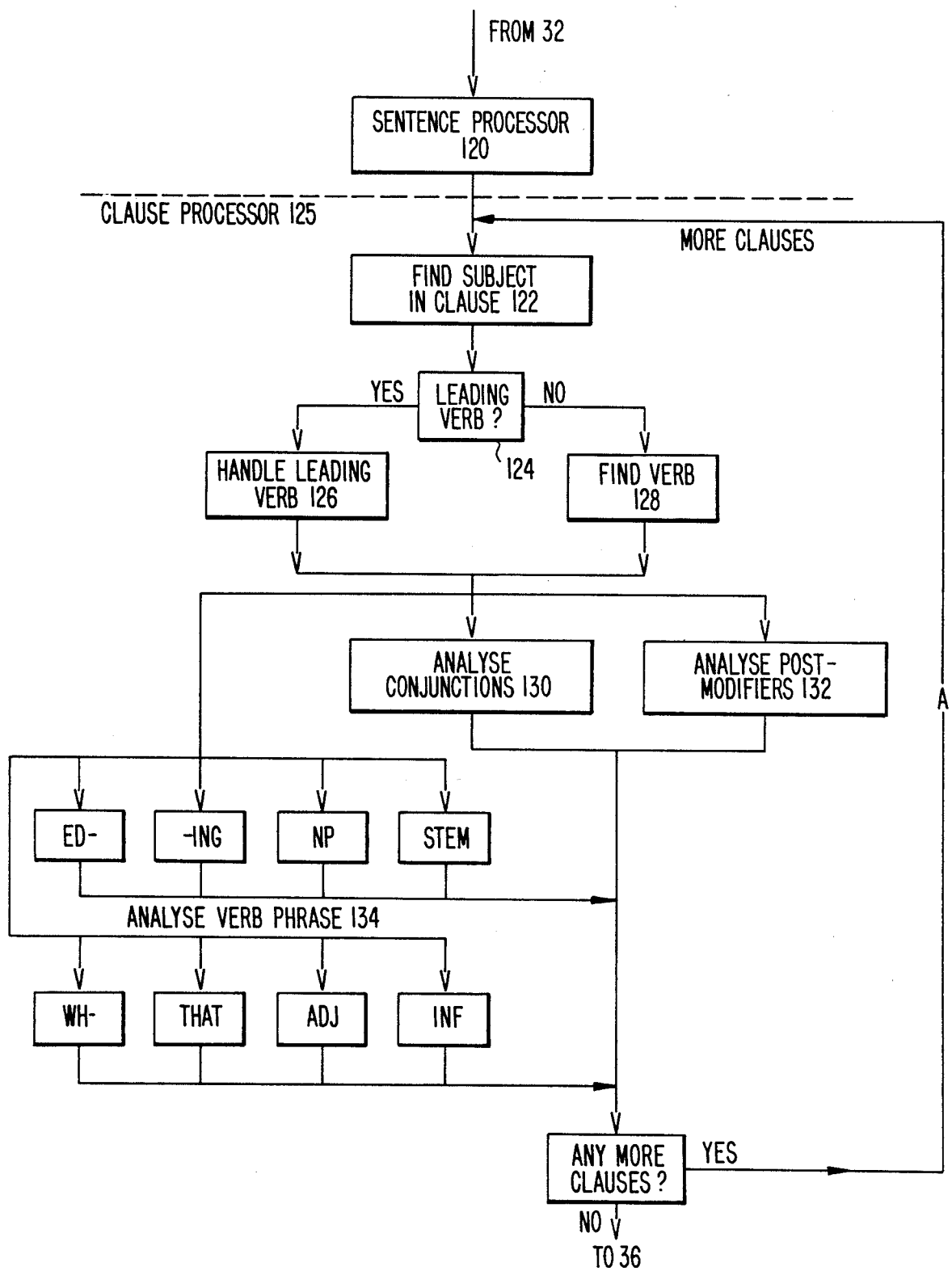

In FIG. 15, after verb groups have been identified, the sentence processor 120 is called to determine the overall sentence structure. This is accomplished by breaking the sentence into its constituent clauses with the clause processor 125. A "clause" consists most generally of a subject, verb, and complements as in the following example:

"Tom read the book." Here "Tom" is the subject, "read" is the verb, and "the book" is the verb complement. Many other patterns are of course possible.

A sentence may consist of one or more clauses. Sentence processor 120 calls the clause processor 125 repeatedly until all the clauses have been processed. For example, in "Sue made a proposal and Bob read a report" the sequence is as follows:

1. sentence processor calls clause processor
2. clause processor identifies first clause ("Sue made a proposal") and returns
3. sentence processor calls clause processor again
4. clauses processor returns second clause ("Bob read a report")
5. sentence processor recognizes end-of-sentence mark and terminates.

Following is the general sequence, of which the preceding is an example:

1. Sentence 120 calls Clause 125
2. If end-of-sentence reached, exit
3. Otherwise repeat from step 1.

Further, a clause may contain one or more sub-clause, as in the following example:

"Tom, whom I saw yesterday, gave the report."

In this case, "whom I saw yesterday" is a sub-clause within the main clause "Tom gave the report". Many different patterns exist according to the rules of grammar. Their common feature is that a clause is interrupted by one or more subordinate clauses ("sub-clause"). This feature is handled in all cases by a recursive loop in the clause processor 125 as shown in FIG. 15. The technique enables main and subordinate clauses to be handled in a uniform manner by the same procedure.

FIG. 15 shows the control flow (sub-programs) of the Clause Analysis program 125.

The first step in Clause Analysis 125 is to find the subject of the clause. Program 122 accomplishes this. Normally the subject is the first noun or nounlike entity in the clause. However, a clause may lead off with a verb, in which case program 126 must be called to analyze the possible cases. If the subject has been found, program 128 is called to find the verb. When the verb has been found, programs 130, 132 and 134, the completion programs, are called to find the verb complements and complete the clause processing.

Example: "Tom read the book."
1. Subject Analysis 122 recognizes "Tom" as the clause subject and transfers control through 124 to Find Verb 128.
2. Find Verb 128 recognizes "read" as the clause verb and transfers control to Analyze Verb Phrase 134.
3. Completion steps 130, 132 and 134 recognize "the book" as the verb phrase and the clause analysis.

Control returns to program 120, Sentence Processor.
Example: "Give me the book."

1. Subject Analysis 122 recognizes "give" as a possible verb and transfers control to 126.
2. Leading Verb 126 confirms "give" as a leading verb (imperative command) with an implied subject, and transfers control to the completion programs 130, 132 and 134.
3. Completion completes the verb phrase as in the previous example.

FIG. 15 shows the three completion sub-functions to analyze conjunctions 130, to analyze postmodifiers 132 and to analyze verb phrases 134.

Analyze Verb Phrase 134 determines the complements of the clause verb. Following complement determination, if there is a coordinating conjunction (and-/or), Function 130 is called to determine whether the conjunction starts a new clause, or continues the current clause. For example:

"We sell books and *papers." (compound complement)

"Tom paints and *papers walls." (compound verb)

"We sell books and *papers are also available." (compound clause) The method of decision in these cases is by comparison of each alternative with the allowed patterns of English syntax.

When the verb complements and any following conjunctions have been resolved, the clause analysis is completed by checking for possible "dangling" pieces of the clause. Examples of such "postmodifiers" include participles, reflexive pronouns, and adverbs. For example:

"I saw her [myself only yesterday]."

The last three words would be processed by the Postmodifier function 132.

FIG. 15 indicates the major types of verb complements which are recognized by the Verb Phrase function 134. These -ed = past participle
-ing = present participle
NP = noun, noun phrase, or pronoun
STEM = verb stem
WH- = relative personal clause
THAT = relative impersonal clause
ADJ = adjective
INF = infinitive For example:
"Have the report [finished]by tomorrow." (-ed)
"We enjoyed [swimming in the pond]." (-ing)
"Tom hit [the ball]" (NP)
"Have them [come over]tomorrow." (STEM)
"I know [who you mean]." (WH-)
"He said [that no one was responsible]" (THAT)
"Mary turned [green]with envy." (ADJ)
"Who wants [to go home]? " (INF)

All complement types are handled.

Many verbs have two complements, and Verb Phrase 134 also this case. Example: "Mike gave [Mary][the ball]."

The essential points in processing verb complements are: '1. A complement table which lists, for each verb in the lexicon, the possible complement types allowed for that verb.
2. The capability to determine which possible reading (among several alternates) is likely to be correct.
3. Unified processing for non-finite as well as finite verbs.
4. Recursive sub-function calls unify the analysis of nested complements.

The complement type table (point #1 above) is essential to delimit the range of possible complements for a given verb. It is implemented as part of the main lexicon, so as to provide very fast access to the grammar information which pertains to the verb. Point #2 provides superior performance by dynamically pruning the "parse tree", which gives rise to a near-deterministic parse (decisions once made need only rarely be undone). Point #3 ensures program compactness by handling finite and non-finite complements identically. For example:
1. "The knight [handing Tom the sword]performed nobly."
2. "The knight [handed Tom the sword]."

In each of examples (1) and (2) above, the verb complementation function is handled identically (i.e., by the same subroutine).

Finally, point #4 ensures correct and efficient handling of sub-complements via recursion, as in the following examples:
1. "Tom wants [to give [his friend] [a cookie]]."
2. "He knows [that we will do [whatever we want]]."

The program structure mirrors the structure of the language, and this parallelism is a major factor in the design of the Clause analysis Verb Complement Analysis (Step 36 in FIG. 1)

The function of the Verb Complement Analysis is to determine (1) if a particular word that can be a verb is really a verb, and (2) if the word(s) following the verb have the correct part of speech. This is accomplished by maintaining a dictionary of attributes for all the common verbs that indicates, for example, that "JAIL" is a transitive verb with one complement. The sentence "THE SHERIFF WENT TO JAIL", when superficially examined, appears to contain infinitive verb group "TO JAIL", since "JAIL" can be either a verb or a noun. However, examination of the verb attributes indicates that "JAIL" as a verb must be followed by one complement (this is what being transitive means), but because "JAIL" is the last word of the sentence (i.e., there is no complement), therefore it can not be a verb. The verb code is removed from the part of speech property node using the list processing functions. In a similar way, it can be deduced that the word "PARTIES" is not a verb in the sentence "JOHN PLANS PARTIES" based on the complement codes required by the verb "PLANS".

Noun Phrase determination (Step 38 in FIG. 1).

The function of the Noun Phrase Procedure is to identify the words encompassing a noun phrase and to resolve ambiguities in their part of speech. While the Rewrite rules resolve ambiguities based on local context, the Noun Phrase Procedure tries to use more global context taking advantage of the more precise information available at this stage. The Noun Phrase Procedure uses a file containing all irregular nouns in the language so that it can determine, for instance, that "MICE" is a plural noun even tough it does not end in "S" and that its singular form is "MOUSE". In the sentence "THE FAST SHIP COMES AT NOON", the Rewrite rules remove one of the ambiguities from the word "FAST" indicating that it can not be a verb. However, the determination whether "FAST" is an adjective or a noun can only be made once the noun phrase "THE FAST SHIP" has been isolated; this is the function accomplished by the Noun Phrase procedure. First, it is determined that "SHIP" should be included in the Noun Phrase because it is a possible noun (singular) which agrees in person and number with the verb "COMES" (generally, verbs, auxiliaries, prepositions, and sentence delimiters are used as clues to determine whether the noun phrase is complete). At this point the verb part of speech is removed from the word "SHIP" and the word "FAST" is made an adjective since it modifies "SHIP". The first word and the last word of the phrase are marked by adding a "PHRASE" property node with the values "BP" and "EP", respectively.

Prepositional Phrase determination (Step 40 in FIG. 1).

The function of the Prepositional Phrase Procedure is to identify the words encompassing a prepositional phrase. Since, in general, a prepositional phrase consists of a preposition followed by a noun phrase, the parser design takes advantage of this by marking the preposition as the first word of the phrase and then processing the noun phrase. Prepositional phrases are marked by adding a "PHRASE" property node with the values "BR" and "ER", to the beginning and the end of the phrase, respectively, since "R" is the internal code for preposition.

Grammar violation analysis (Step 42 in FIG. 1).

Once the parts of speech of a sentence and the phrase boundaries have been determined, the parser proceeds to check these components for syntactic consistency. The Grammar Violation Analysis is the process that reports the syntactic inconsistencies which are found. The sentence "JOHN AND JIM IS GOING TO TOWN" contains three phrase components: (1) the noun phrase "JOHN AND JIM", (2) the verb phrase "IS GOING", and (3) the prepositional phrase "TO TOWN". Each of these components is correct in isolation; however, the subject of the sentence "JOHN AND JIM" consists of two nouns and is therefore plural, whereas the verb "IS" must be used only for singular subjects. When the Grammar Violation Analysis detects this inconsistency it adds an "ERROR" property node with the value "SV" to the verb. This can then be expanded by any program that invokes the parser into the error message "Subject-Verb disagreement".

The resulting natural language text parser provides a faster, more compact means for parsing a plurality of human languages, than has been available in the prior art.

Although a specific embodiment of the invention has been disclosed it will be understood by those with skill in the art that minor changes can be made to above described details without departing from the spirit and the scope of the invention.

What is claimed is:

1. A data processing method for parsing natural language text, comprising the steps of:
inputting a human language word string;
isolating word components of said input strings;
performing a first morphological analysis of the isolated words from said input string, to strip off prefixes and suffixes;
looking up in a dictionary all the possible parts of speech for each word in said input stream;
performing a second morphological analysis on words from said input data stream which are not successfully matched in said dictionary look-up;
applying complement grammar rules to eliminate impossible parts of speech from consideration based upon the context within which the words of the input data stream occur;

resolving ambiguities in those words which require consideration of semantic as well as as syntactic characteristics;

selecting those words identified as verbs and grouping them according to valid verb group sequences;

performing a clause analysis including a verb analysis complement analysis, a noun phrase determination, a prepositional phrase structure determination and a grammar violation analysis; and outputting a data structure were the words from the input data stream are associated with parts of speech and with group markings that indicate phrase structure.

2. A data processing method for parsing natural language text in a computer having a memory, comprising the steps of:

inputting a human language word string;

isolating word components of said input word string in a bidirectional list data structure;

storing a list data structure in said memory, said list data structure being a plurality of list nodes stored in said memory, each list node including a first address pointer to a preceding list node and a second address pointer to a succeeding list node in said list data structure;

said list data structure further including string nodes stored in said memory, each string nodes being pointed to by a corresponding one of said list nodes, said string node storing information relating to a character string stored in said memory representing one of said isolated word components;

said list data structure further including property nodes stored in said memory, each said property node being pointed to by a corresponding one of said string nodes stored in said memory, said property nodes storing information related to the language attributes of said character string representing said one of said isolated word components;

looking up in a dictionary stored in association with said computer, the language attributes for one of said isolated word components associated with one of said string nodes and storing information access from said dictionary in response thereto, in association with one of said property nodes pointed to by said one of said string nodes; performing an analysis of said input word stream by accessing said list nodes in both a forward and a backward direction along said list data structure, accessing said string nodes pointed to by said accessed list nodes, accessing said property nodes pointed to by said accessed string nodes, and processing in context said character strings and their language attributes relating to said accessing string nodes and property nodes in accordance with stored program instructions for carrying out said analysis;

outputting the results of said analysis;

whereby an analysis can be made using the context within which words occur in the input word string.

3. A data processing method for parsing natural language text in a computer having a memory, comprising the steps of;

inputting a human language word string;

isolating word components of said input word string in a bidirectional list data structure;

storing a list data structure in said memory, said list data structure being a plurality of list nodes stored in said memory, including a first list node having a first backward address pointer to a preceding list node and a first forward address pointer to a second list node in said list data structure, and a first string address pointer;

said second list node further including a second backward address pointer to a said first list node and a second forward address pointer to a succeeding lit node in said list data structure, and a second string address pointer;

said list data structure further including a first string node stored in said memory pointed to by said firs string address pointer for storing information relating to a first character string stored in said memory representing a first one of said isolated word components, and further including a first property address pointer;

said list data structure further including a second string node stored in said memory pointed to by said second string address pointer, for storing information relating to a second character string stored in said memory representing a second one of said isolated word components, and further including a second property address pointer;

said list data structure further including a first property node stored in said memory pointed to by said first property address pointer, for storing information relating to first language attributes of said first character string;

said list data structure further including a second property node stored in said memory pointed to by said second property address pointer, for storing information relating to second language attributes of said second character string;

performing a word context analysis of said input word stream by accessing said first and second list nodes in both a forward and a backward direction along said list data structure, accessing said first and second string nodes pointed to by said accessed first and second list nodes, accessing said first and second property nodes pointed to by said accessed first and second string node, and processing in context said first and second character strings and said first and second language attributes in accordance with stored program instructions for carrying out said word context analysis;

outputting the results of said analysis;

whereby an analysis can be made using the context within which words occur in the input word string.

4. The data processing method for parsing natural language text of claim 3, wherein said word context analysis step comprises the steps of:

applying clause analysis to identify constituent clauses based upon the context within which said first and second word components of the input data stream occur;

outputting a data structure where the words and phrases from the input data stream are associated with parts of speech.

5. The data processing method for parsing natural language text of claim 3, wherein said word context analysis step comprises the steps of:

applying complement grammar rules to eliminate impossible parts of speech from consideration based upon the context within which said first and second word components of the input data stream occur; outputting a data structure where the words from the input data stream are associated with parts of speech.

6. The data processing method for parsing natural language text of claim 3, wherein said word context analysis step comprises the steps of:
applying verb group analysis to identify verb groups based upon the context within which said first and second word components of the input data stream occur;
outputting a data structure where the words from the input data stream are associated with parts of speech.

7. The data processing method for parsing natural language text of claim 6, wherein said verb group analysis includes the step of applying paradigm-based morhphological text analysis to identify the grammatical category of said first word component.

* * * * *